United States Patent [19]

Kirk

[11] 4,260,259

[45] Apr. 7, 1981

[54] METAL ETCH RATE ANALYZER

[75] Inventor: Joseph P. Kirk, Chelsea, N.Y.

[73] Assignee: International Business Machines Corporation, Armonk, N.Y.

[21] Appl. No.: 974,571

[22] Filed: Dec. 29, 1978

[51] Int. Cl.³ .............................................. G01B 9/02
[52] U.S. Cl. ................................................... 356/357
[58] Field of Search ................................ 356/357, 358

[56] References Cited

U.S. PATENT DOCUMENTS

| | | | |
|---|---|---|---|
| 3,612,692 | 10/1971 | Kruppa | 356/357 |
| 4,147,435 | 4/1979 | Habegger | 356/357 |

*Primary Examiner*—Craig E. Church

*Attorney, Agent, or Firm*—James M. Thomson; James R. McBride

[57] ABSTRACT

An improved interferometer system for detecting the etch rate of an opaque material, such as silicon or metal. The system includes means for producing two parallel beams of light, with one beam being directed to the surface of the opaque material, and the other beam being directed to the surface of an adjacent masking material of transparent nature. The rate of etch of the opaque material is detected from the interference pattern changes between the first beam and the second beam. The system utilizes a novel arrangement of beam splitters which results in equal path lengths for the respective beams and further includes a viewing light which is passed by a system of dichroic filters to enable observation of the focus spot.

5 Claims, 4 Drawing Figures

METAL ETCH RATE ANALYZER

DESCRIPTION OF THE INVENTION

TECHNICAL FIELD

The present invention relates to an apparatus for monitoring the etch rate of an opaque material such as silicon or metal utilized in semiconductor processing. More particularly, the invention relates to a system for monitoring the rate of change of thickness of an opaque layer having a transparent layer of masking material located adjacent thereto such as might be typically encountered in an etching step of a semiconductor manufacturing process using a reactive gas plasma.

Accordingly, it is an object of the invention to provide an optical interferometer system for monitoring the rate of change of thickness of an opaque layer wherein two beam paths are utilized with equal path lengths.

It is another object of the invention to provide an optical interferometer system for measuring the rate of change of thickness of an opaque layer wherein visual observation of the layer is possible simultaneous with the measurement.

It is yet a further object of the invention to provide an optical interferometer system utilizing a novel arrangement of a neutral beam splitter and dichroic beam splitters which enable the splitting of a beam into two beam paths with one beam path being focused on the opaque surface to be monitored and the other beam path being focused upon an adjacent transparent mask which is also being etched by a subtractive semiconductor forming process.

BACKGROUND OF THE INVENTION

Detection apparatus and techniques for monitoring the rate of change of thickness of a transparent layer using light interference are well known. Such techniques are utilized to measure the rate of etching of a layer of silicon dioxide upon a silicon substrate, for example. By these techniques a light beam is directed upon the transparent layer and reflected from both the surface of the transparent layer and from the surface of its underlying opaque silicon layer. The reflections interfere with one another causing a beam of varying light intensity that can be detected as the thickness of the oxide layer changes. When the trace goes through one period of oscillation the thickness of the transparent layer is changed by $\lambda/2n$ where $\lambda$ is the wavelength of the light and $n$ is the refractive index of the transparent layer.

Other systems have been developed for determining the rate of change of thickness of opaque materials such as silicon or metal. For example, copending application Ser. No. 811,741 to Habegger for "Interferometric Process and Apparatus for the Measurement of the Etch Rate of Opaque Surfaces" describes such a system. The Habegger invention is satisfactory for measuring the etch rate of opaque materials but has certain limitations. For example, the Habegger arrangement requires the use of a beam path compensator to equalize the paths of the two high intensity beams returning from the uncovered opaque surface and the opaque surface underlying the transparent layer. The present invention is an improvement thereon since it provides a different arrangement of beam splitters which provide equal beam path lengths that do not require a path length compensator. Moreover, the present invention provides a capability for visual observation of the area being monitored.

BRIEF DESCRIPTION OF THE DRAWINGS

Other features and advantages of the invention will become apparent from the following detailed description taken in conjunction with the accompanying drawings wherein.

DETAILED DESCRIPTION OF THE INVENTION

In accordance with the invention an optical interferometer system is provided for detecting the rate of removal of material or the etch rate of an opaque layer which is partially masked by a transparent layer which is also being etched. The system includes a light source which is split into two parallel beams of monochromatic light. The first beam is focused upon the opaque layer to be etched and the second beam is focused upon the transparent layer a short distance from the point of incidence of the first beam.

The rate of etch of the transparent layer is determined by detecting and recording changes in light intensity due to the interference between reflections of the second beam from the top of the transparent layer and from the bottom of the transparent layer, i.e. the surface of the opaque layer beneath the transparent layer. One period of oscillation of the light intensity corresponds to a thickness change in the transparent layer of $\lambda/2n$ where $\lambda$ is the wavelength of the light and $n$ is the refractive index of the transparent layer.

The etching rate of the opaque layer is determined by detecting and recording the changes in light intensity due to the interference between the first beam reflected from the opaque layer and the portion of the second beam reflected from the bottom of the transparent layer, i.e. the top surface of the opaque layer which is immune to etching. In the latter case, one period of oscillation of the light intensity corresponds to the removal of an opaque layer thickness of $\lambda/2 - \Delta X(n-1)$ where $\lambda$ is the wavelength of the light, $n$ is the refractive index of the transparent layer and $\Delta X$ is the transparent layer thickness removed during the same period as determined above.

Figure 1:
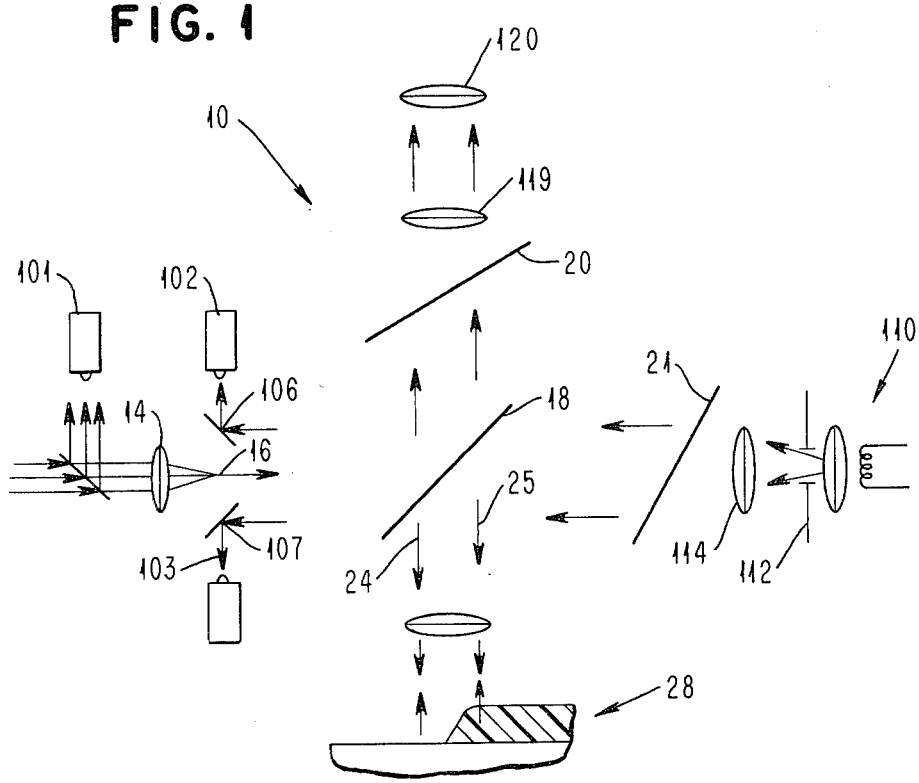
FIG. 1 comprises a schematic view of an optical system adapted for measuring the etch rate of opaque materials.

Referring now to the drawings and particularly to FIG. 1, an interferometer system 10 is illustrated including a probe light 12 adapted to project a beam of monochromatic light upon a lens 14 which focuses the light along a beam path 16 to a neutral beam splitter 18. Beam splitter 18, acting in conjunction with dichroic beam splitters 20, 21, acts to produce two separate parallel light beams 24, 25 directed toward sample 28 in a manner best seen in FIG. 2.

Figure 2:
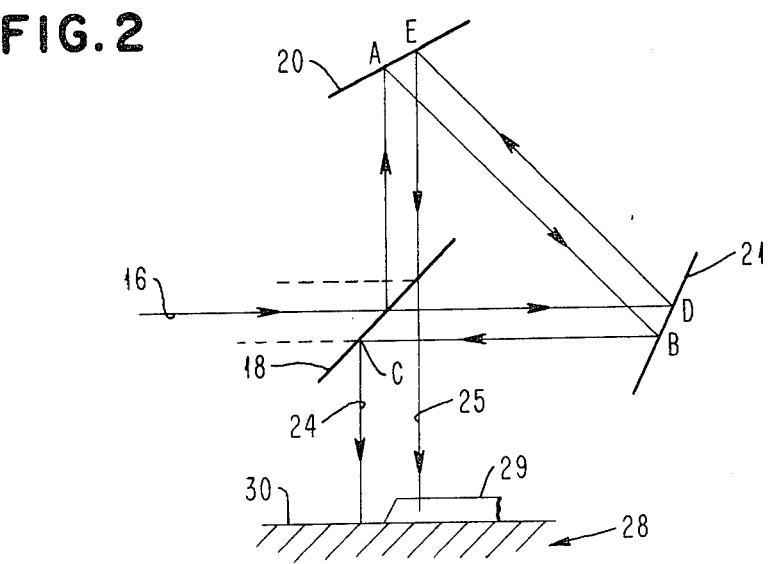
FIG. 2 is a partial schematic view illustrating the path of the probe light on its way to the opaque surface to be monitored.

Referring now to FIG. 2, beam 16 is partially reflected by the upper surface of neutral beam splitter 18 which is oriented at a 45° angle with respect to the light source and to the target. The upwardly reflected portion of beam 16 strikes dichroic splitter 20 at point A and is reflected therefrom to point B on dichroic splitter 21. The beam portion is again reflected from point B to point C on the underside of beam splitter 18 where it is reflected toward the target thereby forming beam 24. A second portion of beam 16 is transmitted through splitter 18 and strikes beam splitter 21 at point D. That portion of beam 16 is reflected from point D and strikes the underside of beam splitter 20 at point E, being reflected therefrom toward splitter 18. The beam passes through splitter 18 and thereby forms beam 25 directed to target 28. As shown, beam 24 strikes the opaque surface of the substrate and beam 25 strikes the upper surface of transparent mask 29.

In order to obtain the configuration illustrated dichroic splitter 20 is oriented at a 22.5 degree angle with respect to splitter 18 and dichroic splitter 21 is oriented at a 22.5 degree angle with respect to splitter 28. The dichroic splitters are conventional elements which pass light of a certain wavelength and reflect light of other wavelengths. In the present case the probe light is selected to have a wavelength of 632.8 nanometers.

In the system illustrated beam 24 is reflected from opaque surface 30 and returns along a path substantially parallel to beam 40 until it reaches beam splitter 18. In similar fashion beam 25 is reflected from both the upper surface of transparent layer 29 and the upper surface of opaque layer 30, thereby forming a returning beam which consists of the interfering reflective beams from those surfaces. The returning portion of beam 24 is designated beam 34 and the returning portion of beam 25 is designated beam 35.

Figure 3:
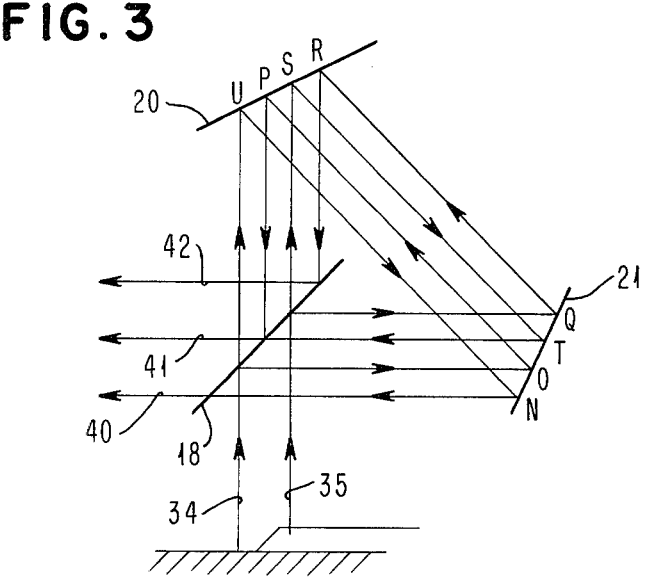
FIG. 3 is a fragmentary schematic view illustrating the path of the probe light after reflection from the opaque surface being monitored.

Referring now to FIG. 3 the paths of the probe light reflected from the sample surface are explained. As shown, a portion of beam 34 is transmitted through beam splitter 18 and strikes splitter 20 at a point U. The beam is reflected from point U toward splitter 21 striking the latter at point N and is again reflected along a path 40 through beam splitter 18 toward source 12. Another portion of beam 34 is reflected from splitter 18 and strikes dichroic splitter 21 at point O, is reflected toward splitter 20 striking the latter at point P. The light reflected from point P strikes the center of splitter 18 and is reflected along a path 41 toward light source 12.

In similar fashion, a portion of beam 35 is reflected from the underside of splitter 18 and strikes beam splitter 21 at point O, being reflected therefrom toward a point R on splitter 20. The light reflected from point R strikes beam splitter 18 and is reflected along a path 42 toward light source 12.

Finally, a portion of beam 35 is passed through splitter 18 and strikes splitter 20 at a point S, being reflected therefrom toward a point T on splitter 21. The portion of beam 35 reflected from point T passes through splitter 18 along beam path 41 toward light source 12.

It should be apparent that the light directed along beam path 40 comprises light from beam 34 reflected from the opaque surface; the light directed along beam path 41 comprises light of beam 35 reflected from the upper surface of the transparent film and from the opaque surface underneath the transparent film; and light from beam 34 reflected from the opaque surface which is outside the transparent film; and light along path 42 includes portions of beam 35 reflected from the upper surface of the transparent layer as well as light reflected from the opaque surface under the transparent layer.

As illustrated in FIG. 1, the light from beam path 41 reaches detector 101 and comprises a composite of light reflected from three levels or surfaces. In similar fashion the light from beam path 42 reaches a detector 102 and comprises light reflected from two surfaces of the wafer being monitored. Finally, light from beam path 40 reaches a detector 103, as shown and comprises light reflected from a single layer of the surfaces being monitored.

Figure 4:
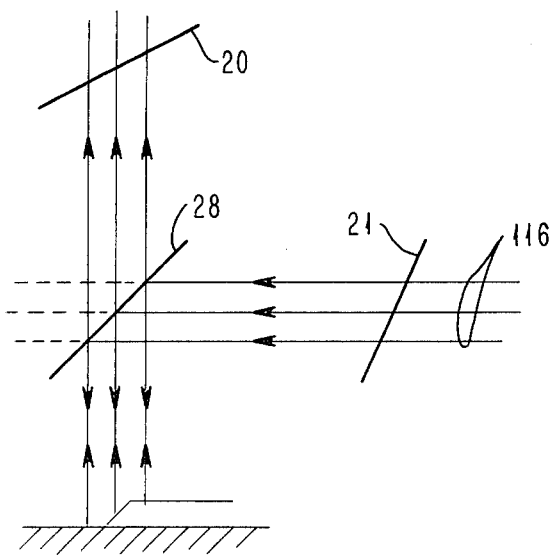
FIG. 4 is a fragmentary schematic view illustrating the beam paths of the light used to view the opaque surface being monitored.

The system otherwise includes means for visual observation of the surfaces comprising a source of viewing light 110 which is defined by an aperture 112 and focused by a lens 114 along a path 116 best seen in FIG. 4. As shown in that Figure, the light from the viewing source is selected to have a frequency such that it will pass through beam splitter 20, 21 along the paths illustrated. Thus, the light from the viewing source is directed through splitter 21, is reflected by neutral beam splitter 18 until it reaches the surface of the wafer. Light reflected from the surfaces of the wafer is transmitted through neutral beam splitter 18 and dichroic beam splitter 20 toward an observation station illustrated in FIG. 1. The observation station comprises a lens 119 and an aperture 120 mounted to permit an observer to view the region of the wafer being illuminated by the probe light. This permits operation of the system in a manner which tells an observer the general outline of the region being observed by the probe light. Consequently the alignment of the system on a desired viewing region is facilitated.

The etching process is started using a reactive gas plasma and the output of detectors 101, 102 and 103 are monitored, for example by viewing the outputs on recorders, to follow the etching progress. The signal from path 42 detected by detector 102 comprises light reflected from surface 29 comprising the top of the mask layer and light reflected from surface 30 underlying the mask layer. The output of the detector is a varying signal which represents the periodic change in light intensity caused by the changing interference between the reflected beams as the thickness of the mask layer changes due to the etching process. When the signal goes through one period of oscillation the thickness of the mask layer has changed by $\lambda/2n$, where $\lambda$ is the wavelength of the light and n is the refractive index of the resist layer. In this fashion, the signal from detector 102 can be monitored to represent the mask etching rate.

The signal derived from path 41 by detector 101 represents a composite of light reflected from all three surfaces of the wafer with the light derived from surface 30 along beam path 34, 35 being the strongest and of equal path length. Thus the highest amplitude oscillations of the 101 channel trace represent the periodic change in light intensity caused by the changing interference between the beams reflected from the uncovered surface 30 and from the underlying surface 30 as the etching process proceeds. These oscillations are amplitude modulated as a result of the resist being etched. One cycle of the 101 channel trace would correspond to the removal of a silicon thickness of $\lambda/2 - \Delta X(n-1)$ where $\lambda$ is the wavelength of light, n is the refractive index of the resist, and $\Delta X$ is the thickness of resist removed during the same interval as deduced from the 102 channel recorder trace.

In this manner the etch rate of the resist or mask and the etch rate of the silicon wafer are simultaneously determined by the system.

The above information can be determined in the presence of visual observation of the sample area.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by Letters Patent is:

1. An interferometer system for determining the etch rates of an opaque material and an overlying transparent layer which partially masks the opaque material comprising:

a light source having a wavelength $\lambda$, beam splitter means for dividing light from said source into a first beam directed along a first beam path onto the free surface of said opaque material in a direction perpendicular to the opaque surface, and a second beam directed along a second beam path onto the surface of the transparent layer in a direction perpendicular to the transparent surface, said beam splitter means defining a first return light path for the reflected light returning from the surface of the transparent layer and the underlying surface of the opaque material, and a second return light path for the light reflected from the free surface of the opaque layer and from the underlying surface of the opaque material, the first and second return light paths being of substantially equal length, said beam splitter means including a neutral beam splitter oriented at an angle with respect to said light source and the surface of said opaque material to direct light thereon, and first and second beam splitters each oriented at an angle with respect to said neutral beam splitter to define a closed light path for the equal length light paths, a first detector means located in the first return to measure and record the change in light intensity of the interfering reflected beams as a function of time with one period of oscillation of the light intensity corresponding to a thickness change in the transparent layer of $\lambda/2n$ where n is the refractive index of the transparent layer, a second detector means located in the second return path to measure and record the change in light intensity of the interfering reflected beams as a function of time with one period of oscillation of the light intensity corresponding to the removal of an opaque layer thickness of $\lambda/2 - \Delta X(n-1)$, where $\Delta X$ is the thickness change of the transparent layer during the same period of time.

2. The system of claim 1 further including means for visual observation of the surface of the transparent layer and the opaque layer during etch rate monitoring.

3. The system of claim 1 wherein said neutral beam splitter is oriented at a 45 degree angle with respect to said light source and said surface of the opaque layer to direct light thereon, and said first and said second beam splitters are each oriented at a 22.5 degree angle with respect to the neutral beam splitter to define a closed light path for the equal length return paths.

4. The system of claim 3 wherein said means for visual observation includes probe light means for directing light against the back surface of the neutral beam splitter and onto the opaque surface, and lens means aligned with the return light paths to observe the image of said probe light.

5. A process for determining the etch rates on opaque material and an overlying transparent layer which partially masks the opaque material comprising providing a light source having a wavelength $\lambda$, dividing the light from the source by means of a beam splitter into a first beam directed along a first beam path onto the free surface of the opaque material in a direction perpendicular to said opaque surface, and a second beam directed along a second beam path onto the surface of the transparent layer in a direction perpendicular to said transparent layer, said beam splitter means including a neutral beam splitter oriented at an angle with respect to said light source and the surface of said opaque material to direct light thereon, and first and second beam splitters each oriented at an angle with respect to said neutral beam splitter, defining a first return light path through said beam splitter means for the reflected light returning from the surface of the transparent layer and the underlying surface of the opaque material, and defining a second return light path through said beam splitter means for the light reflected from the free surface of the opaque layer and from the underlying surface of the opaque material, the first and second return light paths being of substantially equal length, detecting the light from the interfering reflected beams returning from the surface of the transparent layer and from the underlying surface of the opaque material and measuring and recording the change in light intensity of the interfering reflected beams as a function of time with one period of oscillation of the light intensity corresponding to a thickness change in the transparent layer of $\lambda/2n$ where n is the refractive index of the transparent layer, detecting the light from the interfering reflected beams returning from the free surface of the opaque material and from the underlying surface of the opaque material and measuring and recording the change in light intensity of the interfering reflected beams as a function of time with one period of oscillation of the light intensity corresponding to the removal of an opaque layer thickness of $\lambda/2 - \Delta X(n-1)$, where $\Delta X$ is the thickness change of the transparent layer during the same period of time.

* * * * *

UNITED STATES PATENT AND TRADEMARK OFFICE
CERTIFICATE OF CORRECTION

PATENT NO. : 4,260,259

DATED : April 7, 1981

INVENTOR(S) : Joseph P. Kirk

It is certified that error appears in the above—identified patent and that said Letters Patent are hereby corrected as shown below:

Column 3, line 48, "O" should be --Q--.

Signed and Sealed this

Twenty-second Day of September 1981

[SEAL]

Attest:

GERALD J. MOSSINGHOFF

Attesting Officer     Commissioner of Patents and Trademarks